Figure 1:
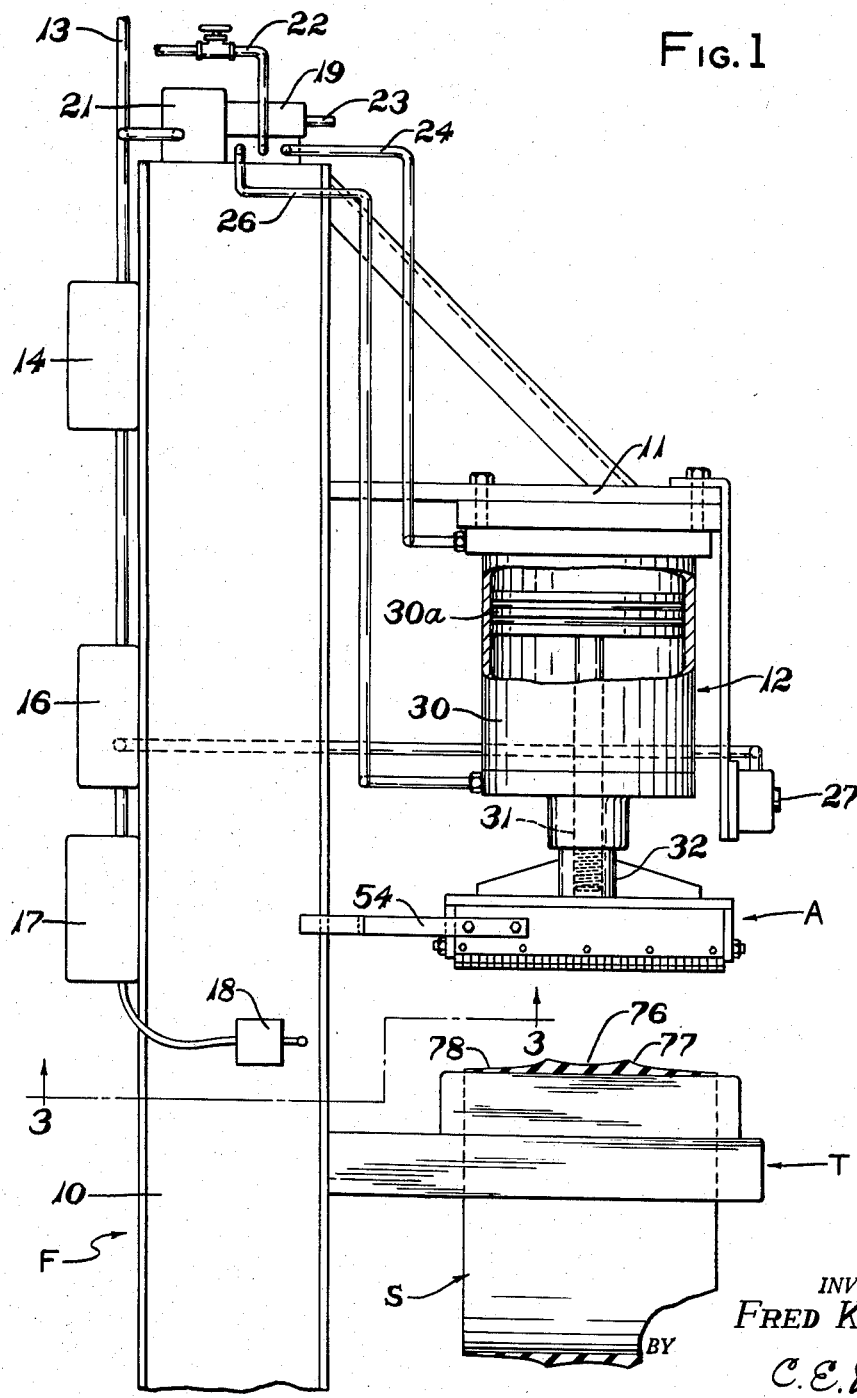

Oct. 11, 1960   F. K. BARNS   2,955,640
PROFILED TIRE TREAD SPLICING
Filed Aug. 19, 1958   5 Sheets-Sheet 2

INVENTOR.
FRED K. BARNS
BY
C. E. Tripp
ATTY.

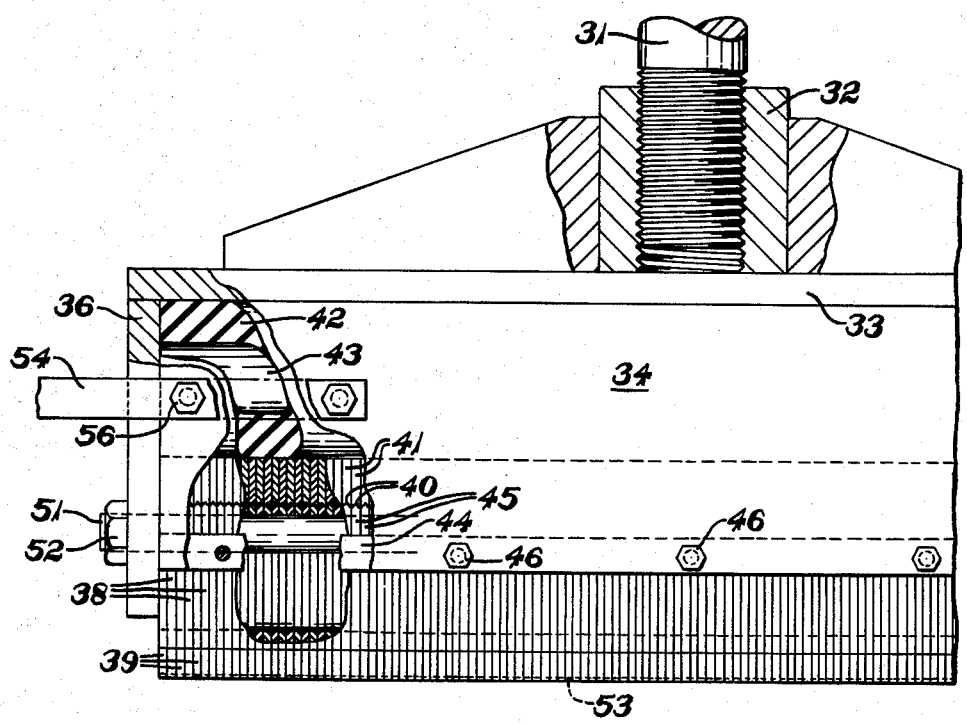
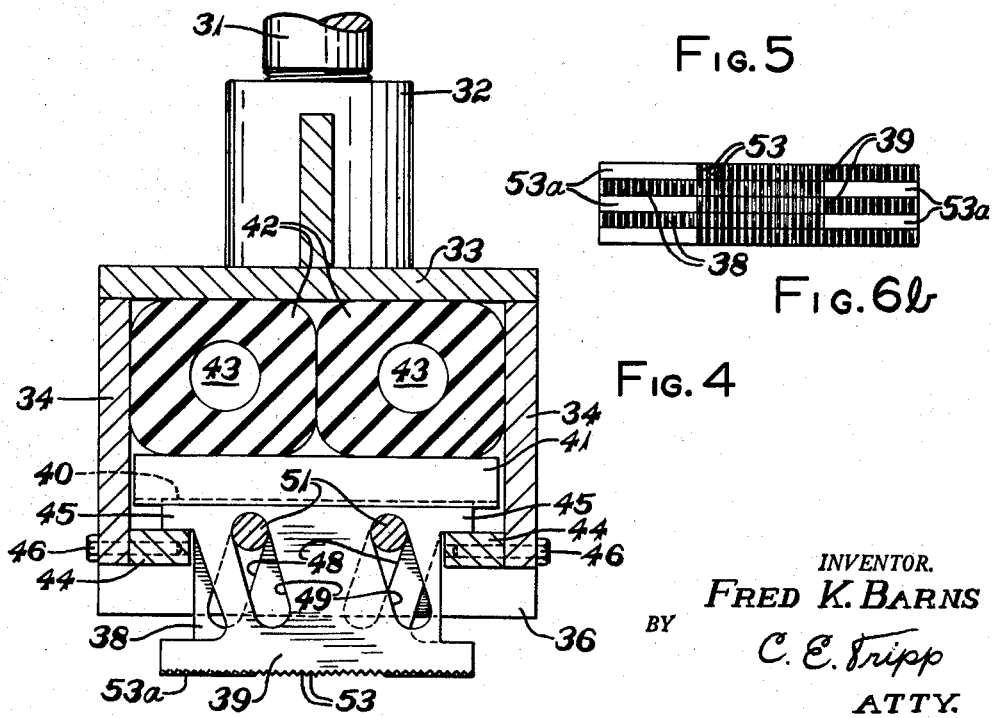

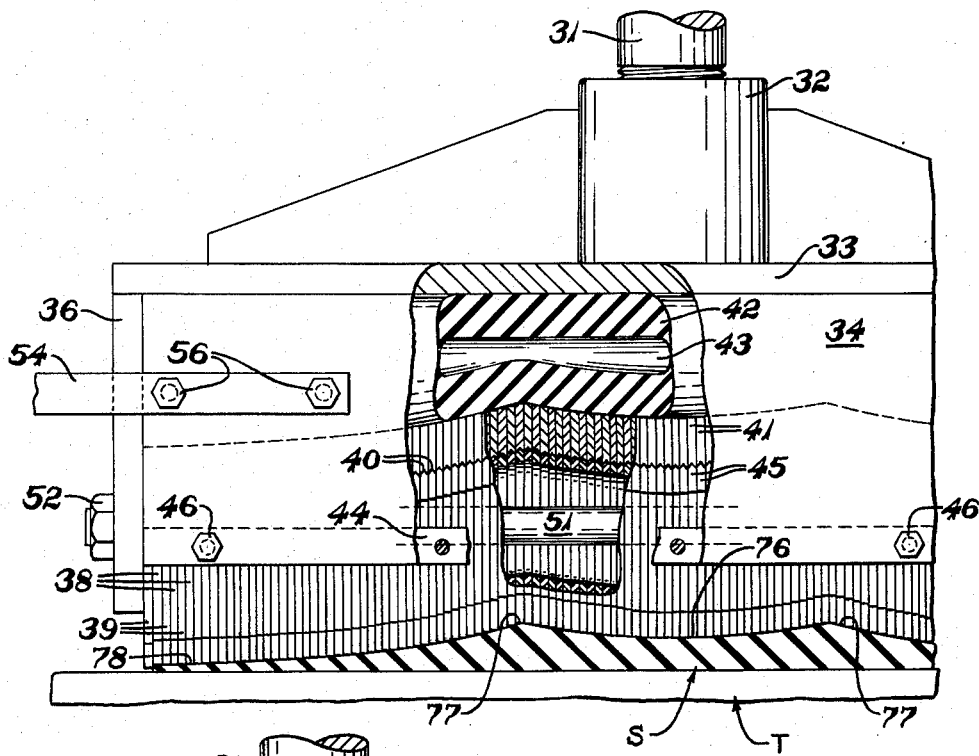
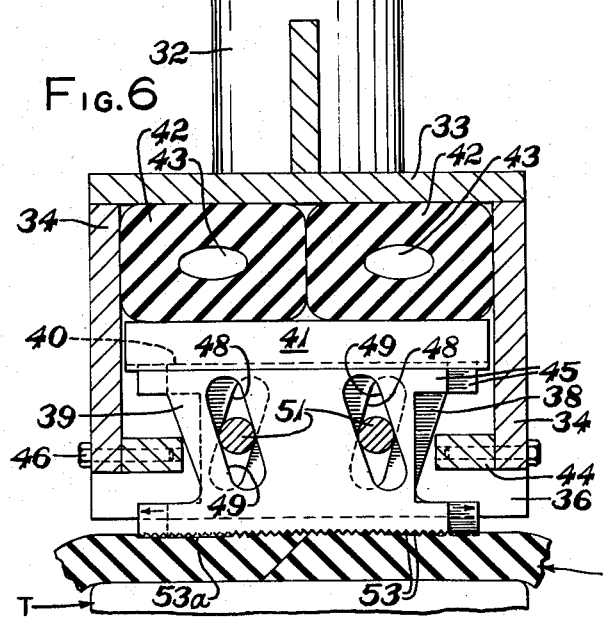
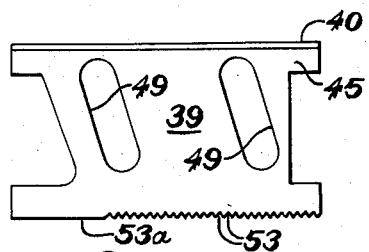
Fig. 7
Fig. 6
Fig. 6a
INVENTOR.
FRED K. BARNS
BY
C. E. Tripp
ATTY.

United States Patent Office 2,955,640
Patented Oct. 11, 1960

2,955,640

PROFILED TIRE TREAD SPLICING

Fred K. Barns, Akron, Ohio, assignor to The B. F. Goodrich Company, New York, N.Y., a corporation of New York Filed Aug. 19, 1958, Ser. No. 756,033

8 Claims. (Cl. 154—9)

This invention relates to tire building apparatus and, more particularly, to an apparatus for splicing the joint in a tire tread strip of unvulcanized rubber. The tread strip may be spliced as a band or I may make the splice when the tread strip is applied to a green or uncured tire carcass, as explained in detail in my copending application application S.N. 755,969, filed August 19, 1958, jointly with E. E. Thompson, and assigned to The B. F. Goodrich Company.

With modern large section, low-inflation tires having a relatively heavy tread portion, coupled with the high-speed operation often encountered in service, the splice area of tire treads has caused considerable difficulty. This difficulty has manifested itself as separation of the splice itself, or at times, separation of the tread from the carcass at the splice, due to a weak splice, or to air trapped between the tread and the carcass or both. It has been customary where tire treads are applied as strips with their complementarily beveled or skived ends spliced on the building drum to rely on manual stitching or roller stitching with mechanically operated splice traversing rollers. The splices thus made have often left much to be desired, as indicated above, the splicing pressure was often inadequate and non-uniform and at times air was trapped between the edges of the tread strip because it is easier to join the strip to the carcass at the thin sidewall portions than at the thicker tread portions during splicing. Air remaining underneath the tread strip during cure may prevent a firm bond.

In accordance with this invention, the splice is made by two mechanically actuated series of toothed plates or jaws extending entirely across the tire at the splice and arranged to conform to the outer side of the tread and sidewall strip during the splicing operation. As these series of jaws are pressed forceably against the splice, mechanism causes them to move together in alternately opposite directions to firmly press and knead the rubber stock and compact the splice as the splicing pressure is applied, the motion being in a direction such as to tend to close the splice circumferentially of the tread strip.

It is an important feature of this invention that the splicing pressure plates or jaws are backed up by one or more thick walled rubber tubes. These tubes have lengthwise apertures that open to the atmosphere and mechanically transmit the actual splice pressure from a ram to the tire. These tubes permit the splicing jaws to conform to the contour of the tread strip as the ram applies splicing pressure, the result being that the greatest pressure is at the thickest part of the splice and the least pressure at the thinner parts, a desirable characteristic in that it insures firm splicing at thicker parts and prevents damage to the stock at the thinner parts. This, however, is not attainable with prior contour splicing or pressure devices wherein the jaws are backed up by an inflatable tube having relatively thin walls because pressure within the tube is the same at all parts along its length regardless of tube deformation. The manner in which these advantages may be obtained will be apparent in the following description of the preferred embodiment of the invention.

Figure 2:
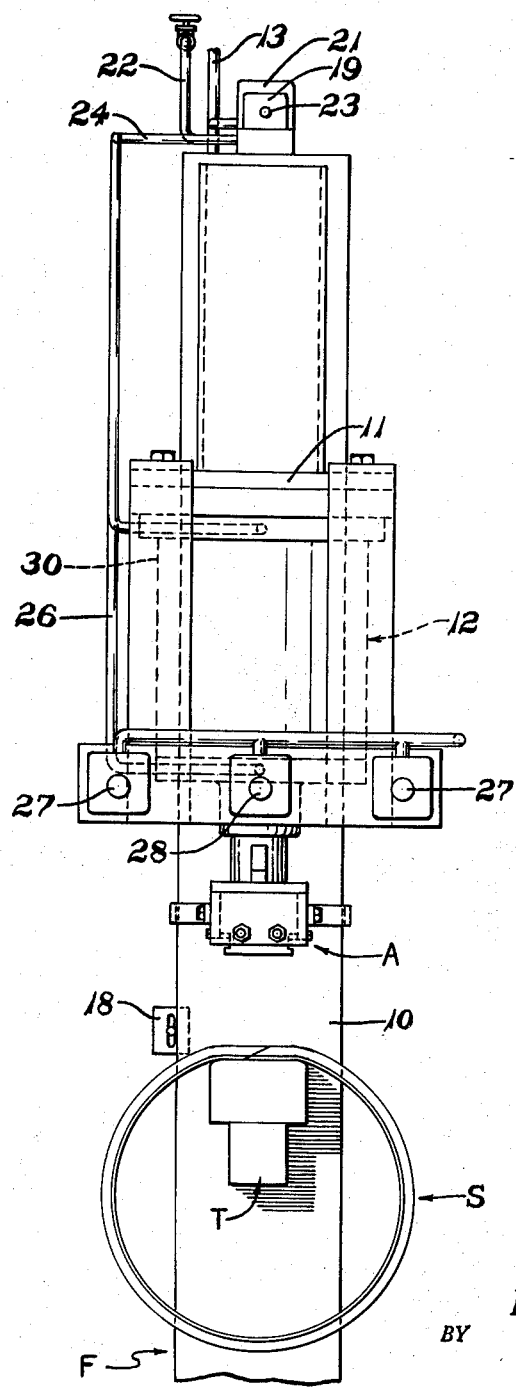
Figure 3:
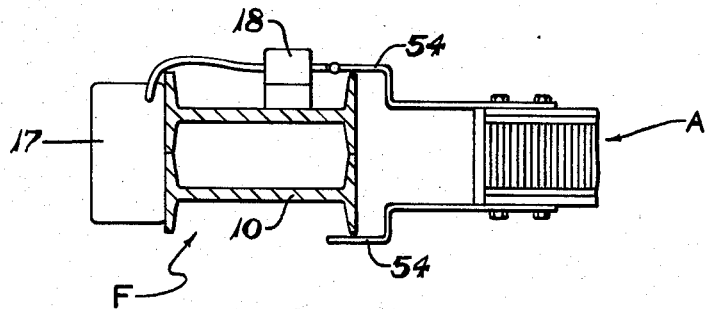
Figure 8:
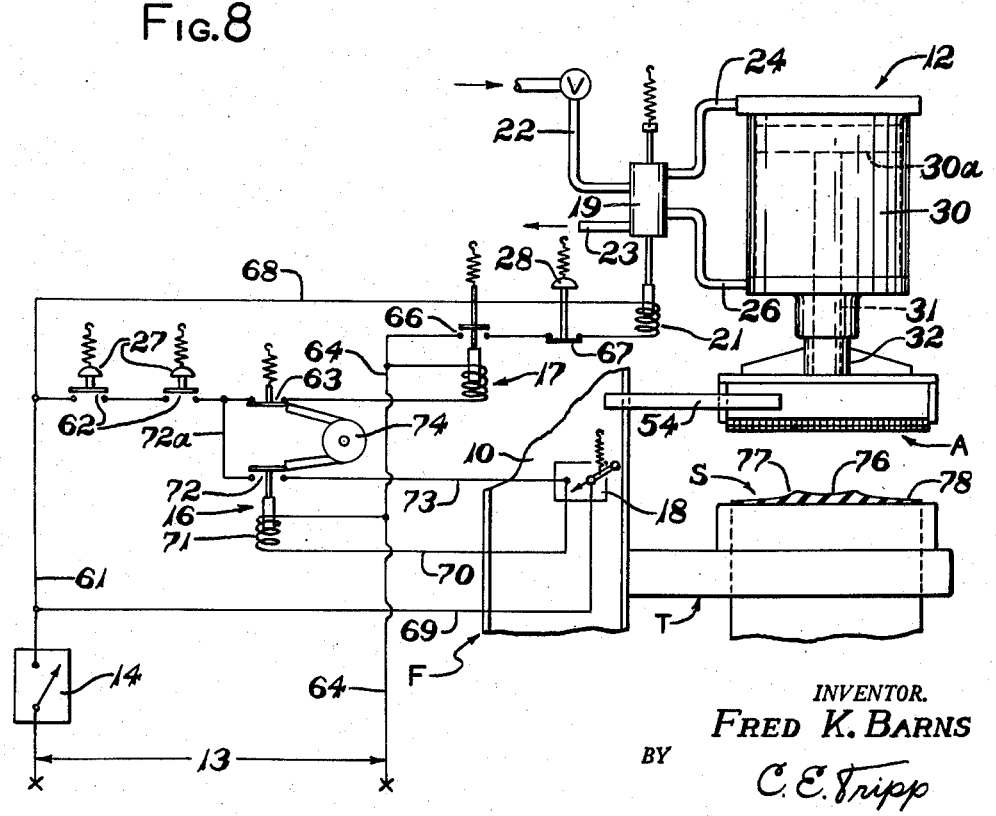

In the drawings:

Fig. 1 is a side elevation of the apparatus;
Fig. 2 is a front view thereof;
Fig. 3 is a section through the frame taken at 3—3 of Fig. 1;
Fig. 4 is a section through the splicing jaw assembly;
Fig. 5 is a partial side view of the splicing assembly with parts broken away;
Fig. 6 is a view similar to that of Fig. 4 with the splicing head pressed against the stock;
Fig. 6A is a side elevation of a splicing jaw-plate;
Fig. 6B is a bottom view of the splicing jaws;
Fig. 7 is a view corresponding to Fig. 5 under the same conditions with the splicing head pressed against the stock; and
Fig. 8 is a schematic diagram of a suitable control circuit.

GENERAL ARRANGEMENT

Referring to Figs. 1 to 3 in which the basic elements of the machine and its operating units appear, the machine has a frame F which consists largely of a vertical upright 10 preferably formed of a pair of I beams welded together as indicated in Fig. 3. The lower end of the upright 10 is mounted on a base or fastened to the floor by means not shown in order to increase the scale of the drawings. Projecting horizontally in cantilever fashion from the upright 10 is a stock table T for receiving the tread strip S which, as mentioned, may or may not be applied to a green tire carcass before the splicing operation. A suitably braced splicing head support 11 is mounted near the top of the upright 10 in order to carry the splicing head assembly A. This assembly is actually mounted by means of a piston and cylinder assembly 12 fastened to support 11. The controlling electrical power units includes a power supply 13, a main off-on switch 14, a timer and timer release unit 16, a relay 17, and a limit switch 18. These units control the four-way pneumatic valve 19 by means of a valve solenoid 21. The valve has an air inlet line 22 and an exhaust port 23. These may be automatically connected to a "down" airline 24 or an "up" airline 26 leading to appropriate ends of the operating cylinder for the machine. The controls are energized or actuated by a pair of "down" buttons 27 that are arranged to require both hands of the operator for initiation of the down stroke. A single "up" button 28 is also provided although this is not normally used. It makes it possible to raise the splicing head A at any time prior to completion of the timed cycle, and is provided as a safety feature.

The splicing head assembly

Referring to Figs. 1, 4 and 5, the splicing head assembly is mounted by means of a piston and cylinder assembly 12 comprising a pneumatic cylinder 30 which contains a piston 30a connected to piston rod 31. The piston rod is threaded in a collar 32 welded to a top plate 33. Side plates 34 and end plates 36 attached thereto provide with the top plate a box-like housing for receiving the rest of the assembly. The actual splicing is performed by sets of right-hand pressure plates or jaws 38 and left-hand jaws 39. The upper edges of the jaw plates 38 and 39 are beveled to form knife edges 40 as best seen in Fig. 5. These seat in complementary V-grooves formed along the lower edges of a row of slide plates 41 interposed between the jaws and a pair of thick walled rubber tubes 42. These tubes are made hollow preferably by means of an elongated hole 43 extending the full length of tubes and opening to the atmosphere at the ends of the tubes. The jaws 38, 39 are prevented from falling out of the box-like structure in which they are mounted by means of a pair of retainer bars 44 (Fig. 4) that engage lugs 45 on the jaws and are fastened to side plate 34 by means of bolts 46. Plates 38 and 39 are each formed with a pair of cam slots 48 and 49 respectively. These are inclined to the vertical in opposite directions and a cam rod 51, threaded on each end, passes through each of the right and left-hand pairs of slots and is fastened to the side plates by nuts 52 shown in Fig. 5. The stock engaging edges of the jaws are serrated as at 53, Fig. 4. The leading ends 53a of each jaw are formed smooth, without serrations, in order to reduce tendency of the jaws to separate the splice.

As seen in Figs. 3 and 5, a pair of guide bars 54 are bolted to side plates 34 by bolts 56. These bars engage the flanges on upright 10 and prevent twisting of the splicing head assembly A. One of these bars serves the additional purpose of actuating the limit switch 18 as the assembly A descends to the splicing position, this relation being apparent in Figs. 1 and 2. Examination of Figs. 4 and 6 will reveal the action at the splicing head as it is pressed against the stock as the assembly is seen in these views. For example, as seen in Fig. 6 this action will cause jaws 38 to move to the right while jaws 39 will simultaneously move to the left as they are moved upwardly relative to the descending housing by resistance of the stock. As the jaws are pressed against the stock, resistance to such pressure is partially accommodated by deformation of the thick walled tubes 42 so that as seen in Fig. 7 the jaws may assume the profile or contour of the tread strip, the greatest pressure being at the thickest cross-sectional zones of the stock. The thick-walled rubber tubes return the jaws to their neutral position shown in Figs. 4 and 5 when the splicing assembly is lifted away from the stock.

The control circuit

A suitable control circuit for the apparatus is shown diagrammatically in Fig. 8. The power supply 13 includes a first line 61 which connects to contacts 62 closed by the "down" buttons 27. Line 61 continues to timing contact 63 of the timer and relay unit 16. The timing contact 63, when closed, energizes the solenoid of the relay 17 which solenoid is connected to the second side 64 of the power supply 13. Relay 17 has "down" contacts 66 which are closed when the relay is energized to pass current through the normally closed contacts 67 of the "up" button 28. This energizes another solenoid 21 that controls a spring biased four-way valve 19 because the other terminal of solenoid 21 connects back to the first side of the power line 61 by means of lines 68. The operator holds the "down" buttons 27 closed, one with each hand, until the splicing head assembly descends and engages the stock. At this time one of the guide bars 54 on the splicing head closes the limit switch 18 setting up a holding circuit. This holding circuit consists of a line 69 connecting the first side 61 of the power line to the limit switch 18 and a line 70 connecting the limit switch to the solenoid 71 of the timer relay. The other end of the solenoid 71 connects directly to the second side 64 of the power line. When solenoid 71 of the timer relay is energized by limit switch 18, the lower relay holding contacts 72 are closed and the holding circuit is established through line 73 running from the left contact of limit switch 18 to the holding contacts 72, and jumper connection 72a leading to the now closed timing contacts 63 and hence through the relay solenoid 17 to the other side 64 of the power line. Thus the "down" buttons 27 are bypassed and the operator can remove his hands from these buttons without causing the splicing assembly A to retract from the stock. As soon as solenoid 71 is energized to close the holding contacts 72 as a result of actuation of limit switch 18 by the descending splicing assembly a pneumatic timer 74 comes into operation. This timer is connected to the holding contacts 72 mechanically and is mechanically connected to the timer relay contact 63 which heretofore have been maintained closed by their spring. It is a function of the pneumatic timer 74 to mechanically open contact 63 after a predetermined period of time selected to insure completion of the splice. Pneumatic timers of this type are well-known items of electrical control equipment and the details of the timer are not illustrated since they form no part of this invention. All that need be said is that on elapse of the selected time the timer 74 overcomes the spring holding contacts 63 closed, the contacts open, and the holding circuit for relay solenoid 17 through jumper 72a is broken. This causes the normally open contacts 66 to return to their open position which in turn opens the power circuit to the valve solenoid 21 from power line 64. Since the valve 19 is biased to the up position the valve shifts and the air supply reverts to the up line 26 raising the splicing assembly head. Limit switch 18 then opens automatically and the circuit is set up for the next cycle. The splicing assembly A can be lifted from the stock at any time by pressing up button 28 thereby opening normally closed contact 67 leading from power line 64 to the solenoid 21 that controls valve 19.

The operation of the apparatus is rather simple and has in fact been outlined as the detailed description proceeded. Having set the timer for the desired cycle, the "down" buttons are pressed until the splicing assembly head engages the stock and trips the limit switch 18. The operator can then permit the "down" buttons to open but pneumatic pressure to the cylinder 30 through the "down" line 24 continues to press the head against the stock. The jaws 38 and 39 first engage the tread portion 76 as seen in Fig. 7 and are most firmly pressed against the tread shoulders 77 from which extend the tapering relatively thin side wall portions 78. As the jaws are raised relatively to their housing by resistance of the stock, this motion is accommodated by deformation of the thick walled rubber tubes 42 and this same motion causes lateral motion of the jaws in alternate opposite directions so that the jaws both press against and knead the stock and compact the splice. The pressure is maintained by the timer 74 until the splice is firmly compacted, a typical time cycle providing a pressure interval of about 10 seconds. The greatest splicing pressure occurs at the thickest sectional areas of the stock which is an advantage since these are the hardest portions to splice. Also, the thinner side wall portions, which are the easiest to splice, receive a smaller pressure and hence are not damaged or torn even though initially the stock engaging edges of the splicing jaws all lie in a plane as seen in Fig. 5. Thus a graduated or selected splicing pressure action is obtained as compared with a constant pressure action typical of inflated rubber tubes and at the same time the added complexity of the tube inflating mechanism is dispensed with.

The slides or spacing plates 41 permit lateral motion of jaws 38 and 39 relative to rubber tubes 42, without sliding abrasion of the jaws over the tubes, and yet vertical accommodation for contouring is also provided. In a typical assembly for average size tires the jaws 38 and 39 will be about ¼" in thickness.

The embodiments in which an exclusive property or privilege is claimed are defined as follows:

1. Apparatus for splicing a skived joint in a tire tread strip of unvulcanized rubber having a cross-sectional profile that is substantially flat on the inner side and contoured on the outer side to provide a relatively thick tread portion joined at each side to a tapered sidewall portion; said apparatus comprising a frame, a horizontal stock support table on said frame, splicing assembly support means on said frame above said stock support table, a splicing head beam, means mounting said beam for vertical motion relative to said stock support table, a plurality of alternate right and left splicing jaw plate means depending from said beam in adjacent parallel relationship with each jaw plate means adapted to extend over both ends of the strip to be spliced, elongated thick walled hollow rubber tube means vertically interposed between said jaw plate means and said beam to transmit splicing pressure while providing vertical accommodation of said jaw plate means to match the tread strip contour, means on said beam engaging said jaw plate means for causing alternate ones thereof to move horizontally in opposite directions to knead and compact the tread strip splice as said jaw plate means are pressed against a tread strip on said table, said jaw plate means simultaneously moving upwardly relative to said beam to follow the contour of the outer side of the tread strip, and means connected to said beam to press said jaw plate means against the tread strip.

2. Apparatus for splicing a skived joint in a tire tread strip of unvulcanized rubber having a cross-sectional profile that is substantially flat on the inner side and being contoured on the outer side to provide a relatively thick tread portion joined at each side to a tapered sidewall portion; said apparatus comprising a frame, a horizontal stock support table on said frame, splicing assembly support means on said frame above said stock support table, a splicing head beam, means mounting said beam for vertical motion relative to said stock support table, a plurality of alternate right and left splicing jaw plates depending from said beam in adjacent parallel relationship with each jaw plate adapted to extend over both ends of the strip to be spliced, slide plates engaging the upper edges of said jaw plates, elongated thick walled hollow rubber tube means vertically interposed between said slide plates and said beam to transmit splicing pressure to said jaw plates while providing vertical accommodation of said slide and jaw plates to match the tread strip contour, means on said beam engaging said jaw plates for causing alternate plates to move horizontally in opposite directions to knead and compact the tread strip on said table, said slide and jaw plates simultaneously moving upwardly relative to said beam to follow the contour of the outer side of the tread strip, and means connected to said beam to press said jaw plates against the tread strip.

3. Apparatus for splicing a skived joint in a tire tread strip of unvulcanized rubber having a cross-sectional profile that is substantially flat on the inner side and being contoured on the outer side to provide a relatively thick tread portion joined at each side to a tapered sidewall portion; said apparatus comprising a frame, a horizontal stock support table on said frame, splicing assembly support means on said frame above said stock support table, a splicing head beam, means mounting said beam for vertical motion relative to said stock support table, a plurality of alternate right and left splicing jaw plate means depending from said beam in adjacent parallel relationship with each jaw plate means adapted to extend over both ends of the strip to be spliced, elongated thick walled hollow rubber tube means vertically interposed between said jaw plate means and said beam to transmit splicing pressure while providing vertical accommodation of said jaw plate means to match the tread strip contour, said right and left hand jaw plate means having mutually oppositely inclined slots formed therein, a cam rod mounted on said beam and extending through said slots for causing alternate jaw plate means to move horizontally in opposite directions to knead and compact the tread strip splice as said jaw plate means are pressed against a tread strip on said table, said jaw plate means simultaneously moving upwardly relative to said beam to follow the contour of the outer side of the tread strip, and means connected to said beam to press said jaw plate means against the tread strip.

4. Apparatus for splicing a skived joint in a tire tread strip of unvulcanized rubber having a cross-sectional profile that is substantially flat on the inner side and being contoured on the outer side to provide a relatively thick tread portion joined at each side to a tapered sidewall portion; said apparatus comprising a frame, a horizontal stock support table on said frame, splicing assembly support means on said frame above said stock support table, a splicing head beam, means mounting said beam for vertical motion relative to said stock support table, a plurality of alternate right and left splicing jaw plates depending from said beam in adjacent parallel relationship with each jaw plate adapted to extend over both ends of the strip to be spliced, slide plates engaging the upper edges of said jaw plates, elongated thick walled hollow rubber tube means vertically interposed between said slide plates and said beam to transmit splicing pressure to said jaw plates while providing vertical accommodation of said slide and jaw plates to match the tread strip contour, said right and left jaw plates having mutually oppositely inclined slots formed therein, a cam rod mounted on said beam and extending through said slots for causing alternate plates to move horizontally in opposite directions to knead and compact the tread strip splice as said jaw plates are pressed against a tread strip on said table, the said slide and jaw plates simultaneously moving upwardly relative to said beam to follow the contour of the outer side of the tread strip, and means connected to said beam to press said jaw plates against the tread strip.

5. An apparatus as defined in claim 4 wherein the strip engaging surfaces of said jaw plates have at least a portion thereof roughened.

6. An apparatus for splicing adjacent ends of unvulcanized rubber material comprising a splicing head including a plurality of splicing jaw means disposed in adjacent parallel relationship with each jaw means adapted to extend over both adjacent ends of a single side of the material to be spliced, resilient means backing said jaw means and adapted to deform when the jaw means are in pressure-exerting contact with the material, means to move said head to and from pressure-exerting contact of the jaw means with the material to be spliced, and means carried by said head cooperating with said jaw means to cause alternate ones of the jaw means to move transversely of the direction of movement of the head when the jaw means are moved into pressure-exerting contact with the material.

7. An apparatus for splicing adjacent ends of unvulcanized rubber material comprising a plurality of splicing jaw members disposed in adjacent parallel relationship with each jaw member adapted to extend over both adjacent ends of a single side of the material to be spliced, resilient means backing said jaw members and adapted to deform when the latter are in pressure-exerting contact with the material, means to move said jaw members as a unit into contact with the said material and exert pressure on the latter through said resilient means, and cooperating cam means carried by said jaw members and said means to move the latter as a unit operative to move alternate ones of the jaw members in opposite directions transversely of the direction of movement of the members as a unit when the said members are moved into pressure-exerting contact with the material to be spliced.

8. An apparatus for splicing adjacent ends of unvulcanized rubber material comprising a head, a plurality of splicing members movably supported on said head in adjacent parallel relationship, resiliently deformable means between said members and head for transmitting pressure from said head to said members, cooperating cam surfaces on said head and members operatively to effect parallel movement of alternate ones of said members in opposite directions transversely of the head in response to movement of the members toward and from the head, and means to move said head to and from pressure-exerting contact of the said members upon the material to be spliced with each member extending over both ends of the material.

References Cited in the file of this patent

UNITED STATES PATENTS

| | | |
|---|---|---|
| 2,186,286 | Engler et al. | Jan. 9, 1940 |
| 2,273,185 | Engler et al. | Feb. 17, 1942 |
| 2,273,463 | Campbell et al. | Feb. 17, 1942 |
| 2,489,324 | Remark | Nov. 29, 1949 |
| 2,562,540 | Engler et al. | July 31, 1951 |